United States Patent
Hottovy et al.

(10) Patent No.: US 10,494,200 B2
(45) Date of Patent: Dec. 3, 2019

(54) MEASUREMENT OF PRODUCT PELLETS FLOW RATE

(71) Applicant: Chevron Phillips Chemical Company LP, The Woodlands, TX (US)

(72) Inventors: John D. Hottovy, Porter, TX (US); Paresh C. Mody, Houston, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 343 days.

(21) Appl. No.: 15/137,472

(22) Filed: Apr. 25, 2016

(65) Prior Publication Data
US 2017/0305689 A1 Oct. 26, 2017

(51) Int. Cl.
| | |
|---|---|
| *B65G 53/66* | (2006.01) |
| *B65G 53/04* | (2006.01) |
| *B65G 53/30* | (2006.01) |
| *B01F 15/00* | (2006.01) |
| *G01F 1/74* | (2006.01) |
| *G01F 1/88* | (2006.01) |
| *B29B 9/06* | (2006.01) |
| *B29B 9/16* | (2006.01) |

(52) U.S. Cl.
CPC ........ *B65G 53/66* (2013.01); *B01F 15/00162* (2013.01); *B01F 15/00344* (2013.01); *B65G 53/04* (2013.01); *B65G 53/30* (2013.01); *G01F 1/74* (2013.01); *G01F 1/88* (2013.01); *B01F 15/00142* (2013.01); *B01F 15/00149* (2013.01); *B29B 9/06* (2013.01); *B29B 9/065* (2013.01); *B29B 9/16* (2013.01); *B65G 2201/042* (2013.01)

(58) Field of Classification Search
CPC ......... B65G 53/66; B67D 1/1234; G01F 1/88; G01G 1/88
USPC .......... 406/14, 18, 197; 137/14; 222/14, 21, 222/56, 59
See application file for complete search history.

(56) References Cited

U.S. PATENT DOCUMENTS

| | | | |
|---|---|---|---|
| 2,601,676 A | 6/1952 | Trainer et al. | |
| 3,148,231 A | 9/1964 | Spencer | |
| 3,391,232 A | 7/1968 | Jackson | |

(Continued)

FOREIGN PATENT DOCUMENTS

EP 3186051 B1 4/2018

OTHER PUBLICATIONS

Monazam, Esmail R., et al., "Estimate of Solid Flow Rate from Pressure Measurement in Circulating Fluidized Bed," Powder Technology, Sep. 2010, 15 pages plus one page publishing information, vol. 203, No. 1.

(Continued)

*Primary Examiner* — Joseph A Dillon, Jr.
(74) *Attorney, Agent, or Firm* — Conley Rose, P.C.

(57) ABSTRACT

A process is described that includes flowing a carrier fluid through a transfer line, feeding polymer pellets into the transfer line at a feed location, measuring a first pressure value of the carrier fluid at a location in the transfer line upstream of the feed location, measuring a second pressure value of the carrier fluid and polymer pellets at a downstream location in the transfer line which is downstream of the feed location, and determining a mass flow rate of the polymer pellets flowing in the transfer line based on a differential pressure between the first pressure value and the second pressure value.

16 Claims, 1 Drawing Sheet

(56) References Cited

U.S. PATENT DOCUMENTS

| | | | | |
|---|---|---|---|---|
| 3,635,082 A * | 1/1972 | Prellwitz | G01F 1/712 | 324/684 |
| 3,736,930 A * | 6/1973 | Georgi | A61M 5/1689 | 128/DIG. 13 |
| 4,029,362 A * | 6/1977 | Kortenbusch | B65G 53/30 | 406/109 |
| 4,037,598 A * | 7/1977 | Georgi | A61M 5/1689 | 128/DIG. 12 |
| 4,059,310 A * | 11/1977 | Waskiewicz | B65G 53/66 | 406/30 |
| 4,379,663 A * | 4/1983 | Allison | B65G 53/66 | 222/134 |
| 4,397,405 A * | 8/1983 | Batson | B67D 7/42 | 222/14 |
| 4,413,642 A * | 11/1983 | Smith | E21B 34/16 | 137/102 |
| 4,425,790 A | 1/1984 | Bice et al. | | |
| 4,490,077 A * | 12/1984 | Shimada | G01F 1/74 | 406/124 |
| 4,529,336 A * | 7/1985 | Shinozaki | C21B 5/003 | 222/1 |
| 4,574,849 A * | 3/1986 | Fukuda | G01F 11/28 | 141/1 |
| 4,662,798 A * | 5/1987 | Fassbinder | B65G 53/66 | 406/14 |
| 4,863,316 A * | 9/1989 | Gianella | B05B 7/1445 | 406/14 |
| 5,006,018 A * | 4/1991 | Depew | B65G 53/24 | 406/152 |
| 5,048,761 A * | 9/1991 | Kim | B65G 53/66 | 110/265 |
| 5,132,917 A * | 7/1992 | Bass | C10J 3/723 | 406/10 |
| 5,148,841 A * | 9/1992 | Graffin | B65B 3/28 | 141/128 |
| 5,285,735 A * | 2/1994 | Motoi | F23K 3/02 | 110/101 CB |
| 5,487,624 A * | 1/1996 | Toyota | B05B 7/1404 | 406/14 |
| 5,685,640 A * | 11/1997 | Goedicke | B01F 13/0255 | 222/195 |
| 5,816,448 A * | 10/1998 | Kobold | B67D 1/1211 | 222/36 |
| 5,975,747 A * | 11/1999 | Flaherty | G01F 25/0092 | 222/14 |
| 6,062,774 A * | 5/2000 | Fourcroy | B65G 53/66 | 406/197 |
| 6,089,794 A * | 7/2000 | Maguire | B65G 53/24 | 406/18 |
| 6,092,693 A * | 7/2000 | Powell | B67D 1/0037 | 222/129.1 |
| 6,119,710 A * | 9/2000 | Brown | G01F 1/50 | 137/14 |
| 6,447,215 B1 * | 9/2002 | Wellmar | B65G 53/66 | 406/11 |
| 6,491,811 B2 * | 12/2002 | Conrad | C01B 13/11 | 210/100 |
| 7,066,689 B2 * | 6/2006 | Maguire | B65G 53/66 | 406/163 |
| 7,610,167 B2 * | 10/2009 | Stanton | G05D 11/134 | 141/13 |
| 7,669,734 B2 * | 3/2010 | Arnold | G05D 7/0635 | 222/1 |
| 8,869,718 B2 * | 10/2014 | Binsirawanich | A01C 7/081 | 111/174 |
| 2002/0114672 A1* | 8/2002 | Isozaki | B65G 53/66 | 406/11 |
| 2005/0210998 A1* | 9/2005 | Dimarco | G01F 1/3209 | 73/861.22 |
| 2011/0268510 A1* | 11/2011 | Thorn | B65G 53/66 | 406/30 |
| 2012/0257934 A1* | 10/2012 | Kretschmer | C10J 3/723 | 406/14 |
| 2012/0328378 A1* | 12/2012 | Hatton | F24F 7/06 | 406/12 |
| 2013/0202370 A1* | 8/2013 | Moretto | B65G 53/66 | 406/151 |
| 2017/0283720 A1* | 10/2017 | Schmit | B65G 53/12 | |
| 2018/0305140 A1* | 10/2018 | Stark | B65G 53/526 | |
| 2018/0313733 A1* | 11/2018 | Molz | A01F 12/46 | |

OTHER PUBLICATIONS

Váradi, Sándor, et al., "Determination of the Pressure Drop of the Mixture of Gas and Solid Material Flowing in a Pipe," pp. 1-10.

* cited by examiner

MEASUREMENT OF PRODUCT PELLETS FLOW RATE

TECHNICAL FIELD

The present disclosure relates to the flow of polymer pellets from an extruder and through a transfer line.

BACKGROUND

Polymerization processes produce polymer product, often referred to as "polymer fluff", which in many cases can be subsequently further processed in an extruder to produce polymer pellets. Components fed to the extruder may include the polymer fluff and optional additives which are added to the polymer fluff to impart desired characteristics (e.g., certain mechanical, physical, and melt properties) to the extruded polymer pellets. The extruder, also equivalently known as a pelletizer, can convey, heat, melt, and cut the extruder feed, and the molten polymer mixture can be extruded (e.g., via a twin screw extruder) through a pelletizing die under select pressure to form the polymer pellets. The extruded polymer pellets are typically cooled (e.g., in air or water) at or near the discharge region of the extruder.

The extruded polymer pellets may then be transported to a product load-out area for further processing comprising storing, blending with other pellets, and/or loading into railcars, trucks, bags, supersacks, or other containers for distribution to customers. In pellet transport systems which utilize transfer lines to move the pellets from the extruder to the load-out area, knowing the flow rate of the polymer pellets in the transfer line is desirable. The prior art suffers from the limitations of incomplete or inaccurate knowledge of the rate from the extruder, which is used to determine the appropriate amount of stabilizer or other additive to feed to the extruder. The inventions described in the present disclosure are an improvement over the prior art.

BRIEF SUMMARY

Disclosed herein is a process comprising flowing a carrier fluid through a transfer line, feeding polymer pellets into the transfer line at a feed location, measuring a first pressure value of the carrier fluid at a location in the transfer line upstream of the feed location, measuring a second pressure value of the carrier fluid and polymer pellets at a downstream location in the transfer line which is downstream of the feed location, and determining a mass flow rate of the polymer pellets flowing in the transfer line based on a differential pressure between the first pressure value and the second pressure value.

Further disclosed herein is a system comprising a transfer line, a carrier fluid source positioned at a first location of the transfer line, the carrier fluid source to provide a carrier fluid in the transfer line, a polymer pellet source, the transfer line configured to receive polymer pellets from the polymer pellet source at a second location of the transfer line, the second location being downstream of the first location, a first pressure sensor positioned at a third location of the transfer line, the first pressure sensor to measure a first pressure value of the carrier fluid in the transfer line at the third location, the third location being between the first location and the second location, a second pressure sensor positioned at a fourth location of the transfer line, the second pressure sensor to measure a second pressure value of the carrier fluid containing the polymer pellets in the transfer line at the fourth location, the fourth location being downstream of the second location, and a computer system coupled to the first pressure sensor and the second pressure sensor, the computer system configured to determining a mass flow rate of the polymer pellets flowing in the transfer line based on a differential pressure between the first pressure value and the second pressure value.

Also disclosed herein is a process comprising providing a carrier fluid to a transfer line at a first location, receiving, from a polymer pellet source, polymer pellets into the transfer line at a second location, the second location being downstream of the first location, measuring a first pressure value of the carrier fluid in the transfer line at a third location, the third location being between the first location and the second location, measuring a second pressure value of the carrier fluid and polymer pellets in the transfer line at a fourth location, the fourth location being downstream of the second location, and determining a mass flow rate of the polymer pellets flowing in the transfer line based on a differential pressure between the first pressure value and the second pressure value.

BRIEF DESCRIPTION OF THE DRAWINGS

For a detailed description, reference will now be made to the accompanying drawings in which.

DETAILED DESCRIPTION

The FIGURES described above and the written description of specific structures and functions below are not presented to limit the scope of what Applicants have invented or the scope of the appended claims. Rather, the FIGURES and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Described herein are systems and processes for determining a mass flow rate, a volume flow rate, or both mass and volume flow rates of polymer pellets flowing in a transfer line based on a differential pressure measured between two locations in the transfer line. The two locations are generally located in the transfer line before and after polymer pellets are picked up and transported by a carrier fluid to a conveying velocity. The differential pressure is used to determine the extrusion mass flow rate, which can be used to control the flow of one or more additives to an extruder, direct the flow of polymer pellets to or away from a container, and determine the mass flow rate, volume flow rate, or both mass and volume flow rates of polymer pellets transferred to a container.

Figure 1:
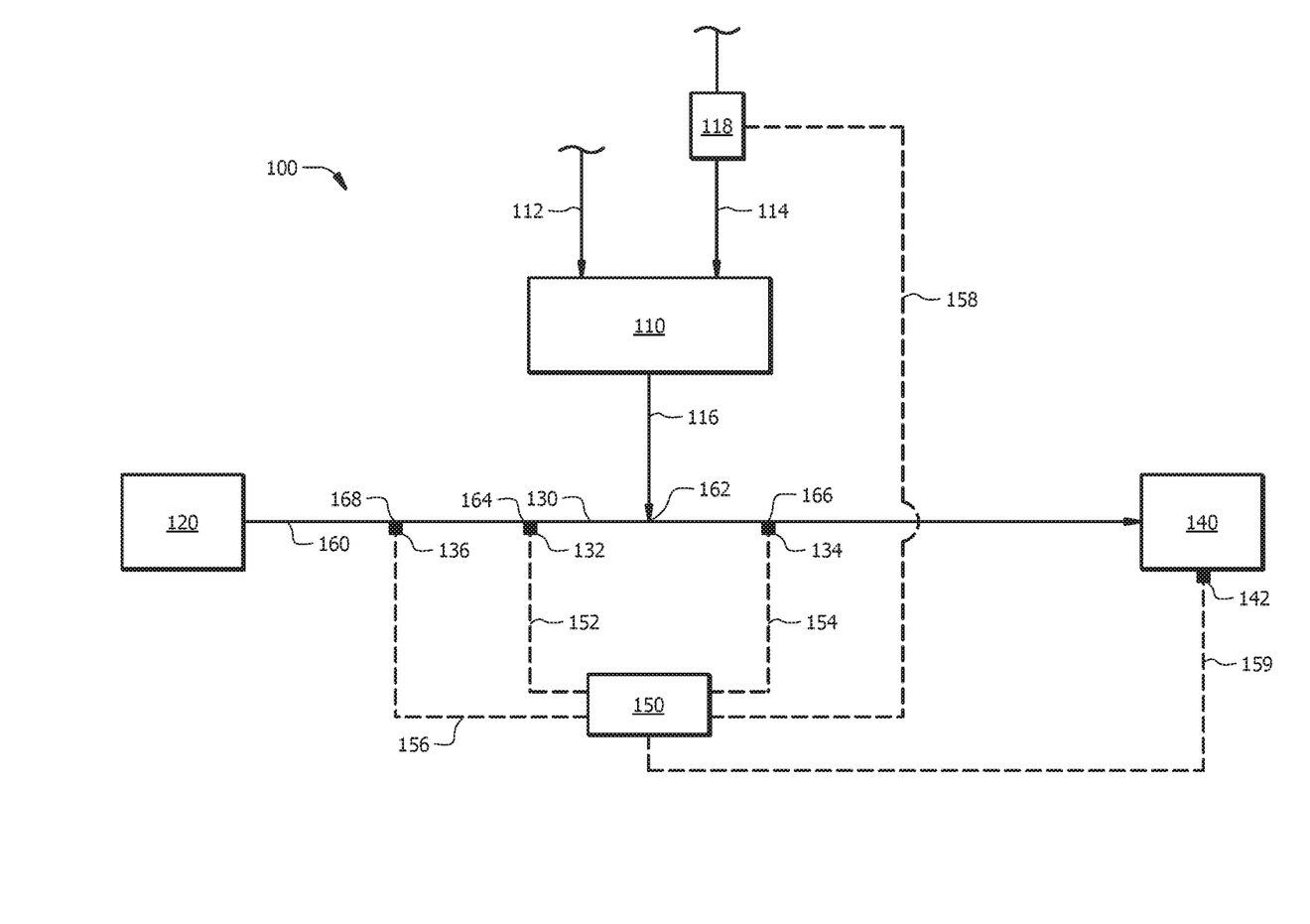
FIG. 1 is a schematic illustration of the disclosed system.

Turning now to the figures, FIG. 1 generally illustrates a system 100 which includes a polymer pellet source 110, a carrier fluid source 120, a container 140, a transfer line 130 connecting the carrier fluid source 120 and the container 140, and a computer system 150 which is connected to a first pressure sensor 132 of the transfer line 130, to a second pressure sensor 134 of the transfer line 130, and to an optional flow sensor 136 of the transfer line 130. The computer system 150 can also be connected to additive equipment 118 and a load cell 142 for the container 140. The transfer line 130 is also connected to the polymer pellet source 110 via extruded pellet line 116.

The polymer pellet source 110 can be any source of polymer pellets. For example, the polymer pellet source 110 can be any extruder which transforms polymer product (e.g., polymer fluff or polymer powder) into polymer pellets. The polymer product can be received from, for example, a flash tank, a degassing vessel, or fluff storage tank of a polymerization process which produces the polymer product by polymerizing a monomer (e.g., ethylene, propylene, styrene) according to techniques known in the art. The polymer product can feed to the polymer pellet source 110 by way of polymer product line 112. In aspects where the polymer pellet source 110 is an extruder (also referred to as a pelletizer), additive line 114 can be optionally used for mixing one or more additives with the polymer product fed to the polymer pellet source 110. Additive(s) can feed into the extruder continuously, periodically, or both continuously and periodically via additive line 114 using additive equipment 118 (e.g., a control valve connected to the computer system 150 via control line 158). The extruder can heat and melt the polymer product and the molten polymer with the additive(s) to for a molten polymer mixture. The mixture can be extruded (e.g., via a twin screw extruder or similar extruder) through a pelletizing die under appropriate extrusion pressure to form the extruded polymer pellets. In the polymer pellet source 110, the extruded polymer pellets can be cooled (e.g., in air or water) before flowing from the polymer pellet source 110 via extruded pellet line 116.

For put purposes of this disclosure, the term "pellet" means any discrete unit or portion of a given material, having any shape or configuration, whether regular or irregular. Thus, the term "pellet" may encompass particles, droplets, pieces, portions, or pastilles of a given material. By the term "polymer" is meant a compound or mixture of compounds consisting primarily of repeating structural units called monomers, and is meant to include a prepolymer or an oligomer, that is, a polymer having a low molecular weight or a polymer intended as a feedstock for a higher molecular weight polymer. The polymer may also include additives and other processing agents as described in further detail herein.

The polymer product can be made of any polymer including low density polyethylene (LDPE), linear low density polyethylene (LLDPE), medium density polyethylene (MDPE), high density polyethylene (HDPE), and copolymers thereof.

The one or more additives can be any additive for producing polymer pellets known in the art. Nonlimiting examples of additives include surface modifiers, slip agents (such as oleamide, erucamide, stearamide, behenannfle, oleyl paimitamide, stearyl erucamide, ethylene bis-oleamide, N,N'-Ethylene Bis(Stearamide) (EBS), including most grades of their respective refinement), antiblocks/antiblock agents (also called "antitack" agents) such as diatomaceous earth, tackifiers, dispersing agents, antioxidants, nucleating agents, pigments, dyes and colorants, including $TiO_2$, processing aids such as elastomers, waxes, oils, fluoroelastomers, antistats/anti-static agents, scavengers, odor enhancers, degradation agents, ultraviolet stabilizers, heat stabilizers, viscosity enhancers, plasticizers, delustrants, flame retardants such as antimony oxide, fillers and extenders such as alumina, silica, clays, and calcium carbonate, surfactants, lubricants such as talc, glass fibers, blowing agents, and combinations thereof. Any additive can be fed to the polymer pellet source 110 (such as an extruder) at a mass flow rate such that the amount of the additive is from about 0.0001 wt. % to about 99 wt. % relative to a mass flow rate of polymer product fed to the polymer pellet source 110 through polymer product line 112.

The transfer line 130 is fluidly connected to both the polymer pellet source 110 and the carrier fluid source 120. The transfer line 130 can be a pipe, tube, conduit, or other structure known in the art with the aid of this disclosure for fluid-flow assisted transfer of polymer pellets (e.g., pneumatic transfer). In certain aspects of the disclosure, an exemplary diameter of the transfer line 130 can be in the range from about 15.2 cm (6 inches) to about 40.6 cm (16 inches). Pressures in the transfer line 130 can be, for example, less than about 15 psig (less than about 103.4 kPa).

FIG. 1 illustrates the carrier fluid source 120 positioned at a first location 160 of the transfer line 130. In FIG. 1, the transfer line 130 is connected to extruded pellet line 116 of the polymer pellet source 110 at a second location 162 (e.g., a feed location 162) of the transfer line 130. The first location 160 and the second location 162 are spaced apart from each other, such that first location 160 is upstream of the second location 162. The transfer line 130 is configured to receive the polymer pellets from the polymer pellet source 110 at the second location 162 of the transfer line 130. The second location 162 of the transfer line 130 (e.g., where the polymer pellets are received from the polymer pellet source 110) is downstream of the first location 160 in the transfer line 130 (e.g., where the carrier fluid source 120 is positioned).

The transfer line 130 can have a first pressure sensor 132 positioned at a third location 164 in the transfer line 130 and a second pressure sensor 134 positioned at a fourth location 166 in the transfer line 130. The third location 164 is a location which is upstream of the second location 162 (e.g., feed location 162) of the transfer line 130. The third location 164 can also be characterized as being between the first location 160 and the second location 162. The fourth location 166 is a location which is downstream of the second location 162 (e.g., the feed location) of the transfer line 130. The fourth location 166 can also be characterized as being downstream of each of the first location 160, the second location 162, and the third location 164. In accordance with aspects of the present invention, the distance between the second location 162 (e.g., the feed location) and the fourth location 166 (e.g., the downstream location) in the transfer line 130 can be from about 0.5 meter (1.6 ft) to about 15 meters (49.2 ft); alternatively, from about 0.5 meter (1.6 ft) to about 10 meters (32.8 ft); alternatively, from about 1 meter (3.28 ft) to about 15 meters (49.2 ft); alternatively, from about 3 meters (9.8 ft) to about 6 meters (19.7 ft); alternatively, from about 2 meters (6.6 ft) to about 5 meters (16.4 ft).

The first pressure sensor 132 is configured to measure a first pressure value of the carrier fluid (absent polymer pellets) in the transfer line 130 at the third location 164. The second pressure sensor 134 is configured to measure a second pressure value of the carrier fluid containing the polymer pellets in the transfer line 130 at the fourth location 166. The first pressure sensor 132, the second pressure sensor 134, or both the first and second pressure sensors 132 and 134 can include any pressure sensor of any type (e.g., electronic, pneumatic, mechanical, or combinations thereof) which can detect and measure pressure in the transfer line 130. The first pressure sensor 132, the second pressure sensor 134, or both the first and second pressure sensors 132 and 134 include any instrument that measures the upstream and downstream pressure simultaneously and transmits a signal that is proportional to the differential pressure. A nonlimiting example is the Foxboro® IDP10 Electronic Differential Pressure Transmitter (available from Foxboro Eckardt GmbH, Stuttgart, Germany), which measures the difference between two pressures applied to opposite sides of a silicon strain gauge microsensor within the sensor assembly.

The first pressure sensor 132 can be positioned in the transfer line 130 to detect the pressure at the third location 164 which is a location between the carrier fluid source 120 and the second location 162, i.e., the feed location where the transfer line 130 receives the extruded polymer pellets. The first pressure sensor 132 can be positioned as close to the second location 162 as practicable. For example, the first pressure sensor 132 is positioned equal to or less than about 6, 5, 4, 3, 2, 1, or 0.5 feet upstream from the second location 162. Without being limited by theory, the portion of the transfer line 130 between the carrier fluid source 120 and the second location 162 (e.g., the feed location where polymer pellets are received) may have a pressure drop along the length thereof; thus, positioning the first pressure sensor 132 as close to the second location 162 as practicable minimizes the incorporation of any pressure drop in the transfer line 130 which is not associated with pickup of the polymer pellets, into the differential pressure which is used to calculate the mass flow rate of the polymer pellets. Additionally or alternatively, the differential pressure can be corrected to account for any pressure drop not associated with pickup of the polymer pellets in the transfer line 130, and the third location 164 where the first pressure sensor 132 is positioned in the transfer line 130 may be at any point in the transfer line 130 which is between the first location 130 of the carrier fluid source 120 and the second location 162 (e.g., the feed location). The correction of the differential pressure may include i) use of additional pressure sensors to detect pressure drops not associated with the polymer pellet pickup, and ii) subtraction of any non-associated pressure drops from the differential pressure used to calculate/determine the mass flow rate of the polymer pellets.

The second pressure sensor 134 can be positioned in the transfer line 130 to detect the pressure at the fourth location 166 which is a location downstream of the second location 162 (e.g., the location where polymer pellets are received in the transfer line 130). The location 166 of the second pressure sensor 134 is far enough from the second location 162 so that the polymer pellets in the carrier fluid reach a conveying velocity. For example, the distance between the second location 162 and the fourth location 166 (the location of the second pressure sensor 134) can range from about 0.5 meter (1.6 ft) to about 15 meters (49.2 ft); alternatively, from about 0.5 meter (1.6 ft) to about 10 meters (32.8 ft); alternatively, from about 1 meter (3.28 ft) to about 15 meters (49.2 ft); alternatively, from about 3 meters (9.8 ft) to about 6 meters (19.7 ft); alternatively, from about 2 meters (6.6 ft) to about 5 meters (16.4 ft). Distances shorter than those disclosed herein may not allow for appreciable acceleration of the pellets so as to cause a reliable differential pressure. Distances larger than those disclosed herein introduce frictional loss in the pressure differential signal as a result of drag by the conveying gas and by the conveyed pellets.

The carrier fluid source 120 is configured in the system 100 to provide a carrier fluid flowing in the transfer line 130. The carrier fluid can be any fluid known in the art for transporting polymer pellets in a transfer line. Nonlimiting examples of carrier fluids include gases such as nitrogen and a combination of oxygen and nitrogen (e.g., air); liquids such as water or a volatile organic liquid (such as an alcohol, including but not limited to ethanol, propanol, isopropanol, butanol, and mixtures thereof, and hydrocarbons having from 2 to 20 carbon atoms and/or a boiling point up to about 360° C.), and combinations thereof; and combinations of one or more gas and one or more liquid. When the carrier fluid includes water, or an organic liquid, the carrier fluid source 120 may be a pump, such as a variable speed displacement pump or similar pressure displacing device. When the carrier fluid includes a gas, the carrier fluid source 120 may be a pressurized source of the gas (e.g., at a pressure higher than the pressure of the transfer line 130) or equipment known in the art which imparts movement to a gas at a desired pressure (e.g., a fan, blower, or compressor). In aspects in which the carrier fluid includes both gas and liquid, the carrier fluid source 120 can be any equipment or combination of equipment known in the art which imparts movement to liquid and gas at a desired pressure in the transfer line 130.

In accordance with aspects of the present disclosure, the carrier fluid source 120 provides the carrier fluid (e.g., a gas such as nitrogen or air) in the transfer line 130 such that a pickup velocity of the carrier fluid at the second location 162 in the transfer line 130 is from about 10 m/s (32.8 ft/s) to about 40 m/s (131.2 ft/s). The pickup velocity is the linear velocity of the carrier fluid in the transfer line 130 just before contact with the polymer pellets at the second location 162 in the transfer line 130.

Once the carrier fluid contacts (e.g., picks up) the polymer pellets at the second location 162, the polymer pellets are accelerated to a conveying velocity. The conveying velocity is reached at a point in the transfer line 130 between the second location 162 and the fourth location 166. In accordance with the present disclosure, the conveying velocity is from about 10 m/s (32.8 ft/s) to about 40 m/s (131.2 ft/s), and the distance between the second location 162 and the fourth location 166 ranges from about 0.5 meter (1.6 ft) to about 15 meters (49.2 ft); alternatively, from about 0.5 meter (1.6 ft) to about 10 meters (32.8 ft); alternatively, from about 1 meter (3.28 ft) to about 15 meters (49.2 ft); alternatively, from about 3 meters (9.8 ft) to about 6 meters (19.7 ft); alternatively, from about 2 meters (6.6 ft) to about 5 meters (16.4 ft). The conveyance of the polymer pellets by the carrier fluid can be referred to as pneumatic conveying in a dilute phase mode, which involves suspension of the polymer pellets in the carrier fluid during transfer through the transfer line 130. The conveying velocity of the polymer pellets is greater than the saltation velocity (e.g., the velocity at which the polymer pellets fall out of suspension in a horizontal section of the transfer line 130), the choking velocity (e.g., the minimum gas velocity required to maintain the polymer pellets in the dilute-phase mode in a vertical section of the transfer line 130), or both the saltation velocity and the choking velocity.

The system 100 can optionally include a flow sensor 136. The flow sensor 136, when included, is positioned in the transfer line 130 to measure the flow rate (e.g., volumetric or mass flow rate) of the carrier fluid before the carrier fluid contacts the polymer pellets (before pickup). The flow sensor 136 is positioned in the transfer line 130 at a location 168 which is upstream of the second location 162. Without being limited by theory, the flow of the carrier fluid upstream of the second location 162 is believed to be substantially constant; thus, the flow sensor 136 can be positioned at any point of the transfer line 130 which is between the first location 160 and the second location 162. In accordance with aspects of the present disclosure, the flow sensor 136 is positioned equal to or less than about 10, 9, 8, 7, 6, 5, 4, 3, 2, 1, or 0.5 feet upstream from the second location 162. The flow sensor 136 may be of any type known in the art (e.g., electronic, pneumatic, mechanical, or combinations thereof) which can measure the flow of gas, liquid, or a mixture of gas and liquid in the transfer line 130. The flow sensor 136 includes any instrument which can detect the flow, convert the flow to a signal, and transmit the signal, e.g., to the computer system 150. The flow rate value of the carrier fluid measured in the transfer line 130 can be temperature and pressure compensated to account for differences in temperature and pressure which depend, for example, on the time of year and the environmental conditions present at the time. In an aspect of the disclosure, the flow sensor 136 is used to determine the pickup velocity of the carrier fluid in the transfer line 130.

The system 100 can also include a container 140 which receives the polymer pellets from the transfer line 130. Nonlimiting examples which can embody the container include railcars, trucks, bags, supersacks, totes, or other containers which are used to distribute the polymer pellets to customers or to other equipment for further processing (e.g., product molding such as into bottles, film, caps, buckets, toys, or car parts). The polymer pellets flow into the container 140 from the transfer line 130, and the carrier fluid either drains from the container (e.g., in aspects where the carrier fluid includes a liquid) or escapes to the atmosphere or through a flare system, or is exited through a vent (e.g., in aspects where the carrier fluid includes a gas).

With continued reference to the FIGURE, FIG. 1 illustrates that the system 100 includes a computer system 150. The computer system 150 is operably coupled to the first pressure sensor 132 via communication line 152, the second pressure sensor 134 via communication line 154, the flow sensor 136 via communication line 156, the additive equipment 118 via communication line 158, a load cell 142 via communication line 159, or combinations thereof. The communication lines can include but are not limited to equipment configured for wireless communication, cellular communication, Bluetooth communication, LAN communication, WAN communication, Ethernet communication, Internet communication, wired communication, pneumatic communication, or combinations thereof.

The computer system 150 can include at least one processor, at least one memory, and instructions stored on the memory which cause the computer system 150 to perform any of the functions disclosed herein. Nonlimiting examples of the computer system 150 include at least one desktop computer, at least laptop computer, at least one mobile device, at least one controller device, at least one server, or combinations thereof.

The computer system 150 can be configured to perform one or more of the following: (i) determine the mass flow rate of the polymer pellets flowing in the transfer line 130, (ii) record the mass flow rate of the polymer pellets which flow to the container 140 during a loading time, (iii) receive a signal regarding a mass of polymer in the container, and optionally further process the signal (e.g., compare the signal to a threshold level to determine that the container 140 is below or at a threshold level of polymer pellets), (iv) determine a total mass or total volume of the polymer pellets in the container 140 based on the mass flow rate of the polymer pellets recorded during the loading time, (v) divert a flow of the polymer pellets away from the container 140, (vi) determine an amount of one or more additives to feed to the polymer pellet source 110 based on the mass flow rate of the polymer pellets in the transfer line 130, (vii) control a flow of the one or more additives fed to the polymer pellet source 110, and/or (viii) combinations thereof.

The mass flow rate of the polymer pellets flowing in the transfer line 130 of the system 100 can be determined based on the differential pressure between a first pressure value measured by the first pressure sensor 132 and a second pressure value measured by the second pressure sensor 134. The mass flow rate of the polymer pellets can be determined using Equation 1:

$$S=(Fg*P/(P-dP))-(Fg*(P/(P-dP)))^2-(4*A^2*dP*g_c/d_s))^5)*(d_s/2) \quad (1)$$

where:

S is the mass flow rate of the polymer pellets in units of $lb_m/s$ or kg/s,

Fg is the volumetric flow rate of the carrier fluid in units of $ft^3/s$ or $m^3/s$, P is the pressure value in the transfer line 130 before pickup of the pellets in units of psig or Pa ($N/m^2$), dP is the differential pressure in the transfer line 130 before and after pellet pickup in units of psi or Pa ($N/m^2$), A is the cross sectional area of the transfer line 130 in units of $ft^2$ or $m^2$, $g_c$ is the gravitational constant in units of $lb_m*ft/lb_f/s^2$ or $N*m^2/kg^2$, $d_s$ is the density of the polymer pellets in units of $lb_m/ft^3$ or $kg/m^3$.

The volumetric flow rate, Fg, can be measured by the flow sensor 136. The pressure value in the transfer line 130 before pellet pickup, P, can be measured by the first pressure sensor 132. The differential pressure, dP, can be determined by measuring the pressure value in the transfer line 130 after pellet pickup with the second pressure sensor 134, and by subtracting the pressure value after pellet pickup (the second pressure value) from the pressure value before pellet pickup (the first pressure value). The cross sectional area of the transfer line 130 is calculated based on the known formula for area of a circle, $A=\pi*R^2$, where R is the radius of the transfer line 130. The gravitational constant, $g_c$, is 32.174 $lb_m*ft/lb_{f/s}$ or $6.674 \times 10^{-11}$ $N*m^2/kg^2$. The density of the polymer pellets, $d_s$, can be obtained from standard testing procedures, for example, ASTM D792 or ISO 1183.

Alternatively, correlations can be developed to determine the mass flow rate of the polymer pellets in the transfer line 130. For example, the mass flow rate of polymer pellets into the transfer line is measured by a pellet flow meter between the polymer pellet source 110 and the transfer line 130 or by a polymer fluff flow meter located upstream of the polymer pellet source 110 (e.g., positioned in polymer product line 112), and experiments can be performed to measure the differential pressure created by various mass flow rates for a given polymer product. The collection of differential pressures can be correlated versus mass flow rate of the polymer pellets, polymer fluff, or both the polymer pellets and polymer fluff, and the correlation can be used (e.g., by the computer system 150) to determine the mass flow rate when differential pressure is measured. For example, the correlations can be used by the computer system 150 in the system 100 of FIG. 1 which has no polymer pellet flow meter or polymer fluff flow meter; alternatively, the correlations can be used in a pellet transfer system which has one or both of such flow meters and uses differential pressure in the transfer line to confirm the mass flow rate of polymer pellets and/or to provide a mass balance versus the polymer product received by the polymer pellet source 110.

The mass flow rate of the polymer pellets in the transfer line 130 may be recorded by the computer system 150 in any manner known in the art for storing information and data. For example, the computer system 150 may store or record the mass flow rate data in one or more of the memory and in a datastore operably coupled with the computer system 150 via a secure cloud storage system. The mass flow rate can be recorded continuously, periodically, or both continuously and periodically during a loading time of the polymer pellets. The loading time can be an interval of time during which the polymer pellets are transferring into the container 140.

A signal can be received by the computer system 150 via communication line 159. The signal can be generated by equipment such as a load cell 142 which measures the total mass of the container 140 and any contents therein. For example, the load cell 142 can measure the mass of the container 140 before pellets are loaded into the container, and thereafter continuously or periodically or both periodically and continuously during transfer of polymer pellets into the container 140. The signal generated by the load cell 142 and received by the computer system 150 can indicate that the container 140 is at a threshold level of polymer pellets. The threshold level can be a mass of polymer pellets in the container 140 which is a proper mass for the container 140 (e.g., does not cause failure of the container 140, or is suitable for freight shipping).

The computer system 150 can determine the total mass or total volume of the polymer pellets in the container 140. For example, the mass or volume of the polymer pellets can be calculated based on the mass flow rate of the polymer pellets recorded during the loading time, which as described above, can be an interval of time during which the polymer pellets are transferred into the container 140. The total mass is the multiple of the mass flow rate and the interval of time. The total volume is the total mass times the density of the polymer pellets. The computer system 150 can determine the total mass or total volume of polymer pellets in the container 140 in response to receiving the signal via communication line 159. The computer can compare the calculated value for mass or volume of polymer pellets to the value determined based upon the signal generated by the load cell 142.

The computer system 150 can cause the flow of the polymer pellets to divert away from the container 140. For example, the computer system 150 can control a valve (not shown) in the transfer line 130 which redirects polymer pellet flow through another portion of the transfer line 130 such that polymer pellets flow to another container when a first container has reached a threshold level. In another example, the computer system 150 can cause a device to move the transfer line 130 such that the outlet of the transfer line 130 is pointed to another container. In yet another example, the computer system 150 can cause the container 140 to move (e.g., a conveyor line) such that another container arrives at the outlet of the transfer line 130. The computer system 150 can divert the flow of polymer pellets in response to receiving the signal via communication line 159 from the load cell 142.

In further aspects of the disclosure, the computer system 150 can determine an amount of one or more additives to feed to the polymer pellet source 110. The determination can be based on the mass flow rate of the polymer pellets calculated in the transfer line 130. For example, if a particular additive is desired in an amount of 1 wt. % relative to the mass flow rate of the polymer pellets in the transfer line 130, then the computer system 150 can determine a mass flow rate of 100 lb/s in the transfer line 130 indicates the additive should be fed to the polymer pellet source 110 at a rate of 1 lb/s (0.45 kg/s).

The computer system 150 can also control a flow of the one or more additives fed to the polymer pellet source 110. For example, having calculated the mass flow rate of polymer pellets in the transfer line 130, the computer system 150 can cause the equipment 118 which feeds any additive to the polymer pellet source 110 to adjust or maintain the flow rate of said additive such that the amount of the additive fed to the polymer pellet source 110 is at the determined amount. The amount of additive determined by the computer system 150 can be from about 1 ppm to about 99 wt. % based on the mass flow rate calculated for the polymer pellets flowing in the transfer line 130.

FIG. 1 can also be used to describe aspects of the disclosed processes. In the disclosed processes, a carrier fluid (e.g., air) can flow through the transfer line 130 (e.g., the carrier fluid being provided by the carrier fluid source 120 such as an air blower at the first location 160 of the transfer line 130), polymer pellets (e.g., polyethylene) can feed into the transfer line 130 at a feed location (e.g., the second location 162 described hereinabove, which is downstream of the first location 160), a first pressure value can be measured for the carrier fluid at a location 164 in the transfer line 130 (e.g., the third location 164 as described herein) which is upstream of the feed location 162, a second pressure value can be measured for the carrier fluid containing the polymer pellets at a downstream location 166 (e.g., a fourth location 166 as described herein) in the transfer line 130 which is downstream of the feed location (e.g., the second location 162 as described herein), and a mass flow rate of the polymer pellets flowing in the transfer line 130 can be determined based on a differential pressure between the first pressure value and the second pressure value. In additional aspects of the processes, the polymer pellets may flow from the transfer line 130 to the container 140, and the total mass or total volume of the polymer pellets in the container can be determined based on the mass flow rate of the polymer pellets recorded during a loading time of the container 140. In further aspects of the processes, a flow of the polymer pellets can be diverted away from the container 140, where determination of the total mass or total volume and diversion of the polymer pellets are performed in response to one or more of a calculated determination and a signal that the container 140 is at a threshold level of polymer pellets. In some aspects, the processes can include determining an amount of one or more additives to feed to the polymer pellet source 110 (e.g., an extruder) based on the determined mass flow rate of the polymer pellets in the transfer line 130, and adjusting or maintaining a flow of the one or more additives to the polymer pellet source 110 (e.g., based on the determined amount of the one or more additives to feed to the polymer pellet source 110). Aspects of the processes can also include accelerating the polymer pellets to a conveying velocity (e.g., from about 10 m/s (32.8 ft/s) to about 40 m/s (131.2 ft/s)) between the second location 162 (e.g., feed location) and the fourth location 166 (e.g., the downstream location) in the transfer line 130. Additionally, aspects of the processes described herein can also include measuring a flow rate of the carrier fluid at a location 168 in the transfer line 130 which is upstream of the second location 162 (e.g., the feed location).

The disclosed and described aspects can determine the mass flow rate of the polymer pellets in the transfer line 130 without need for a mass flow device (e.g., a mechanical pellet flow meter) in the system 100. Mass flow devices are expensive and typically add elevation to the pellet drying system and screener of the polymer pellet source 110. Moreover, positioning a mass flow device upstream of a pellet screener can introduce debris into the mass flow device; thus, causing damage or problems with the operation of the mass flow device. Utilizing the disclosed features and aspects eliminates the need for a mass flow device, saving on capital expenditure for purchase and repair of said devices. Utilizing the disclosed features also lowers the elevation of the pellet drying system and screener of the polymer pellet source 110 (e.g., by about 15 feet elevation), which reduces head pressure required in the pellet water hydraulic loop (e.g., reduces needed operating power) and reduces capital cost, since a structure for higher elevation of the polymer pellet source 110 is not needed.

While the present disclosure has been illustrated and described in terms of particular apparatus and methods of use, it is apparent that equivalent techniques, components and constituents may be substituted for those shown, and other changes can be made within the scope of the present disclosure as defined by the appended claims.

EXAMPLES

The subject matter having been generally described, the following examples are included to demonstrate the practice and advantages thereof, as well as preferred aspects and features of the inventions. It should be appreciated by those of skill in the art that the techniques disclosed in the examples which follow represent techniques discovered by the inventors to function well in the practice of the inventions, and thus can be considered to constitute preferred modes for its practice. However, those of skill in the art should, in light of the present disclosure, appreciate that many changes can be made in the specific aspects which are disclosed and still obtain a like or similar result without departing from the scope of the inventions of the instant disclosure. It is understood that the examples are given by way of illustration and are not intended to limit the specification of the claims to follow in any manner.

Examples 1 and 2 demonstrate the determination of a mass flow rate of polymer pellets based on a differential pressure based on pressures before and after polymer pellet pickup in a transfer line, utilizing air as the carrier fluid in the transfer line. The mass flow rate of polymer pellets in a transfer line for each of Example 1 and Example 2 was calculated using Equation 1 above for both English and SI units.

The values for the parameters of Equation 1 in English units are shown in Table 1 below:

TABLE 1

| | Example 1 | Example 2 |
|---|---|---|
| Air Volumetric Flow Rate, Fg (ft$^3$/s) | 50.6 | 21.8 |
| Pressure Before Pellet Pickup, P (psig) | 11.000 | 10.500 |
| Differential Pressure, dP (psi) | 4.113 | 1.478 |
| Transfer Line Cross Sectional Area, A (ft$^2$) | 0.545 | 0.349 |
| Gravitational Constant, $g_c$ (lb$_m$ * ft/lb$_f$/s$^2$) | 32.174 | 32.174 |
| Pellet Density, $d_s$ (lb$_m$/ft$^3$) | 59.62 | 59.62 |

The values for the parameters of Equation 1 in SI units are shown in Table 2 below:

TABLE 2

| | Example 1 | Example 2 |
|---|---|---|
| Air Volumetric Flow Rate, Fg (m$^3$/s) | 1.43 | 0.617 |
| Pressure Before Pellet Pickup, P (Pa) | 75,842 | 72,395 |
| Differential Pressure, dP (Pa) | 28,358 | 10,190 |
| Transfer Line Cross Sectional Area, A (m$^2$) | 0.0506 | 0.0324 |
| Gravitational Constant, $g_c$ (N * m$^2$/kg$^2$) | 6.674 × 10$^{-11}$ | 6.674 × 10$^{-11}$ |
| Pellet Density, $d_s$ (kg/m$^3$) | 955 | 955 |

Substituting the values of Table 1 into Equation 1 yields the following values for mass flow rate of polymer pellets in the transfer line:

TABLE 3

| | Example 1 | Example 2 |
|---|---|---|
| Mass Flow Rate, S (lb/s) | 33.3 | 11.2 |

Substituting the values of Table 2 into Equation 1 yields the following values for mass flow rate of polymer pellets in the transfer line:

TABLE 4

| | Example 1 | Example 2 |
|---|---|---|
| Mass Flow Rate, S (kg/s) | 15.1 | 5.1 |

Examples 1 and 2 thus demonstrate that mass flow rate of polymer pellets in a transfer line can be calculated using a differential pressure in the transfer line 130, where the differential pressure is the difference between a first pressure of the transfer line before pickup of the polymer pellets and a second pressure of the transfer line after pickup of the polymer pellets.

The pickup velocity of the air for Example 1 was 92.8 ft/s (28.3 m/s). The pickup velocity of the air for Example 2 was 62.5 ft/s (19.1 m/s). The conveying velocity of the air and polymer pellets in the transfer line for Example 1 was 98.8 ft/s (30.1 m/s). The conveying velocity of the air and polymer pellets in the transfer line for Example 2 was 64.9 ft/s (19.8 m/s).

ADDITIONAL DISCLOSURE

Accordingly, the scope of protection is not limited by the description set out above but is only limited by the claims which follow, that scope including all equivalents of the subject matter of the claims. Each and every claim is incorporated into the specification as an aspect of the present invention. Thus, the claims are a further description and are an addition to the detailed description of the present invention.

Aspect 1 is a process comprising flowing a carrier fluid through a transfer line, feeding polymer pellets into the transfer line at a feed location, measuring a first pressure value of the carrier fluid at a location in the transfer line upstream of the feed location, measuring a second pressure value of the carrier fluid and polymer pellets at a downstream location in the transfer line which is downstream of the feed location, and determining a mass flow rate of the polymer pellets flowing in the transfer line based on a differential pressure between the first pressure value and the second pressure value.

Aspect 2 is the process of Aspect 1, further comprising flowing the polymer pellets from the transfer line to a container, and determining a total mass or a total volume of the polymer pellets in the container based on the mass flow rate of the polymer pellets recorded during a loading time of the container.

Aspect 3 is the process of any of the Aspects 1 to 2, further comprising diverting a flow of the polymer pellets away from the container, wherein the step of diverting and the step of determining a total mass or a total volume of the polymer pellets are performed in response to a signal that the container is at a threshold level of polymer pellets.

Aspect 4 is the process of any of aspects 1 to 3, further comprising determining an amount of one or more additives to feed to an extruder based on the mass flow rate of the polymer pellets in the transfer line, wherein the extruder is a source of the pellets fed to the transfer line, and adjusting a flow of the one or more additives to the extruder.

Aspect 5 is the process of aspect 4, where the one or more additives comprise surface modifiers, slip agents, antiblocks, tackifiers, dispersing agents, antioxidants, nucleating agents, pigments, dyes and colorants, processing aids, waxes, oils, fluoroelastomers, antistats, scavengers, odor enhancers, degradation agents, ultraviolet stabilizers, heat stabilizers, viscosity enhancers, plasticizers, delustrants, flame retardants, fillers and extenders, surfactants, lubricants, glass fibers, blowing agents, or combinations thereof.

Aspect 6 is the process of any of aspects 1 to 5, wherein a pickup velocity of the carrier fluid at the feed location is from about 10 m/s to about 40 m/s.

Aspect 7 is the process any of aspects 1 to 6, further comprising accelerating, between the feed location and the downstream location in the transfer line, the polymer pellets to a conveying velocity.

Aspect 8 is the process of aspect 7, wherein the conveying velocity is from about 10 m/s to about 40 m/s.

Aspect 9 is the process of any of aspects 1 to 8, wherein a distance between the feed location and the downstream location is from about 1 meter to about 15 meters.

Aspect 10 is the process of any of aspects 1 to 9, wherein the carrier fluid comprises nitrogen, a combination of oxygen and nitrogen, or water.

Aspect 11 is the process of any of aspects 1 to 10, further comprising measuring a flow rate of the carrier fluid upstream of the feed location of the transfer line.

Aspect 12 is a system comprising a transfer line, a carrier fluid source positioned at a first location of the transfer line, the carrier fluid source to provide a carrier fluid in the transfer line, a polymer pellet source, the transfer line configured to receive polymer pellets from the polymer pellet source at a second location of the transfer line, the second location being downstream of the first location, a first pressure sensor positioned at a third location of the transfer line, the first pressure sensor to measure a first pressure value of the carrier fluid in the transfer line at the third location, the third location being between the first location and the second location, a second pressure sensor positioned at a fourth location of the transfer line, the second pressure sensor to measure a second pressure value of the carrier fluid containing the polymer pellets in the transfer line at the fourth location, the fourth location being downstream of the second location, and a computer system coupled to the first pressure sensor and the second pressure sensor, the computer system configured to determining a mass flow rate of the polymer pellets flowing in the transfer line based on a differential pressure between the first pressure value and the second pressure value.

Aspect 13 is the system of aspect 12, wherein the computer system is further configured to record the mass flow rate of the polymer pellets to a container during a loading time, receive a signal that the container is at a threshold level, and determine a total mass or a total volume of the polymer pellets in the container based on the mass flow rate of the polymer pellets recorded during the loading time.

Aspect 14 is the system of aspect 13, wherein the computer system is further configured to divert a flow of the polymer pellets away from the container, wherein the computer system determines a total mass or a total volume of the polymer pellets and diverts a flow in response to receiving the signal.

Aspect 15 is the system of any of aspects 12 to 14, wherein the polymer pellet source comprises an extruder, and wherein the computer system is further configured to determine an amount of one or more additives to feed to the extruder based on the mass flow rate of the polymer pellets in the transfer line, and control a flow of the one or more additives to the extruder.

Aspect 16 is the system of any of aspects 12 to 15, wherein a pickup velocity of the carrier fluid at the second location is from about 10 m/s to about 40 m/s.

Aspect 17 is the system of any of aspects 12 to 16, wherein the polymer pellets are accelerated to a conveying velocity between the second location and the fourth location in the transfer line.

Aspect 18 is the system of aspect 17, wherein the conveying velocity is from about 10 m/s to about 40 m/s.

Aspect 19 is the system of any of aspects 12 to 18, wherein a distance between the second location and the fourth location is from about 1 meter to about 15 meters.

Aspect 20 is the system of any of aspects 12 to 19, wherein the carrier fluid comprises nitrogen, a combination of nitrogen and oxygen, or water.

Aspect 21 is the system of any of aspects 12 to 20, further comprising a flow sensor to measure a flow rate of the carrier fluid upstream of the second location of the transfer line, the flow sensor being coupled to the computer system.

Aspect 22 is a process comprising providing a carrier fluid to a transfer line at a first location, receiving, from a polymer pellet source, polymer pellets into the transfer line at a second location, the second location being downstream of the first location, measuring a first pressure value of the carrier fluid in the transfer line at a third location, the third location being between the first location and the second location, measuring a second pressure value of the carrier fluid and polymer pellets in the transfer line at a fourth location, the fourth location being downstream of the second location, and determining a mass flow rate of the polymer pellets flowing in the transfer line based on a differential pressure between the first pressure value and the second pressure value.

Aspect 23 is the process of aspect 22, further comprising flowing the polymer pellets from the transfer line to a container, and determining a total mass or a total volume of the polymer pellets in the container based on the mass flow rate of the polymer pellets recorded during a loading time of the container.

Aspect 24 is the process of aspect 23, further comprising diverting a flow of the polymer pellets away from the container, wherein the step of diverting and the step of determining a total mass or a total volume of the polymer pellets are performed in response to a signal that the container is at a threshold level of polymer pellets.

Aspect 25 is the process of any of aspects 22 to 24, further comprising determining an amount of one or more additives to feed to an extruder based on the mass flow rate of the polymer pellets in the transfer line, wherein the extruder is a source of the pellets fed to the transfer line, and adjusting a flow of the one or more additives to the extruder.

Aspect 26 is the process of aspect 25, where the one or more additives comprise surface modifiers, slip agents, antiblocks, tackifiers, dispersing agents, antioxidants, nucleating agents, pigments, dyes and colorants, processing aids, waxes, oils, fluoroelastomers, antistats, scavengers, odor enhancers, degradation agents, ultraviolet stabilizers, heat stabilizers, viscosity enhancers, plasticizers, delustrants, flame retardants, fillers and extenders, surfactants, lubricants, glass fibers, blowing agents, or combinations thereof.

Aspect 27 is the process of any of aspects 22 to 26, wherein a pickup velocity of the carrier fluid at the second location is from about 10 m/s to about 40 m/s.

Aspect 28 is the process any of aspects 22 to 27, further comprising accelerating, between the second location and the fourth location in the transfer line, the polymer pellets to a conveying velocity.

Aspect 29 is the process of aspect 28, wherein the conveying velocity is from about 10 m/s to about 40 m/s.

Aspect 30 is the process of any of aspects 22 to 29, wherein a distance between the second location and the fourth location is from about 1 meter to about 15 meters.

Aspect 31 is the process of any of aspects 22 to 30, wherein the carrier fluid comprises nitrogen, a combination of oxygen and nitrogen, or water.

Aspect 32 is the process of any of aspects 22 to 31, further comprising measuring a flow rate of the carrier fluid upstream of the second location of the transfer line.

While the disclosure has been shown and described in various aspects, modifications thereof can be made without departing from the spirit and teachings of the invention. The aspects and examples described herein are exemplary only, and are not intended to be limiting. Many variations and modifications of the invention disclosed herein are possible and are within the scope of the invention.

Variations, combinations, or modifications of the features made by a person having ordinary skill in the art are within the scope of the disclosure. Alternative aspects that result from combining, integrating, or omitting features are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, 5, 6, . . . ; greater than 0.10 includes 0.11, 0.12, 0.13, 0.14, 0.15, . . . ). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of.

Accordingly, the scope of protection is not limited by the description set out above but is only limited by the claims which follow, that scope including all equivalents of the subject matter of the claims. Each and every claim is incorporated into the specification as an aspect of the present invention. Thus, the claims are a further description and are an addition to the detailed description of the present invention.

What is claimed is:

1. A process comprising:
   flowing a carrier fluid through a transfer line;
   feeding polymer pellets into the transfer line at a feed location;
   measuring a first pressure value of the carrier fluid at a location in the transfer line upstream of the feed location;
   measuring a second pressure value of the carrier fluid and polymer pellets at a downstream location in the transfer line which is downstream of the feed location; and
   determining a mass flow rate of the polymer pellets flowing in the transfer line based on a differential pressure between the first pressure value and the second pressure value measuring a flow rate of the carrier fluid upstream of the feed location of the transfer line.

2. The process of claim 1, further comprising:
   flowing the polymer pellets from the transfer line to a container; and
   determining a total mass or a total volume of the polymer pellets in the container based on the mass flow rate of the polymer pellets recorded during a loading time of the container.

3. The process of claim 2, further comprising:
   diverting a flow of the polymer pellets away from the container;
   wherein the step of diverting and the step of determining a total mass or a total volume of the polymer pellets are performed in response to a signal that the container is at a threshold level of polymer pellets.

4. The process of claim 1, wherein a pickup velocity of the carrier fluid at the feed location is from about 10 m/s to about 40 m/s.

5. The process of claim 4, further comprising:
   accelerating, between the feed location and the downstream location in the transfer line, the polymer pellets to a conveying velocity.

6. The process of claim 5, wherein the conveying velocity is from about 10 m/s to about 40 m/s.

7. The process of claim 5, wherein a distance between the feed location and the downstream location is from about 1 meters to about 15 meters.

8. The process of claim 1, wherein the carrier fluid comprises nitrogen, a combination of oxygen and nitrogen, or water.

9. A system comprising:
   a transfer line;

a carrier fluid source positioned at a first location of the transfer line, the carrier fluid source configured to provide a carrier fluid in the transfer line;

a polymer pellet source, the transfer line configured to receive polymer pellets from the polymer pellet source at a second location of the transfer line, the second location being downstream of the first location;

a first pressure sensor positioned at a third location of the transfer line, the first pressure sensor configured to measure a first pressure value of the carrier fluid in the transfer line at the third location, the third location being between the first location and the second location;

a second pressure sensor positioned at a fourth location of the transfer line, the second pressure sensor configured to measure a second pressure value of the carrier fluid containing the polymer pellets in the transfer line at the fourth location, the fourth location being downstream of the second location; and a computer system coupled to the first pressure sensor and the second pressure sensor, the computer system configured to determine a mass flow rate of the polymer pellets flowing in the transfer line based on a differential pressure between the first pressure value and the second pressure value measuring a flow rate of the carrier fluid upstream of the feed location of the transfer line.

10. The system of claim 9, wherein the computer system is further configured to:

record the mass flow rate of the polymer pellets to a container during a loading time;

receive a signal that the container is at a threshold level; and determine a total mass or a total volume of the polymer pellets in the container based on the mass flow rate of the polymer pellets recorded during the loading time.

11. The system of claim 10, wherein the computer system is further configured to:

divert a flow of the polymer pellets away from the container;

wherein the computer system determines a total mass or a total volume of the polymer pellets and diverts a flow in response to receiving the signal.

12. The system of claim 9, wherein a pickup velocity of the carrier fluid at the second location is from about 1.0 m/s to about 40 m/s.

13. The system of claim 12, wherein the polymer pellets are accelerated to a conveying velocity between the second location and the fourth location in the transfer line.

14. The system of claim 13, wherein the conveying velocity is from about 10 m/s to about 40 m/s.

15. The system of claim 13, wherein a distance between the second location and the fourth location is from about 1 meter to about 15 meters.

16. The system of claim 9, wherein the carrier fluid comprises, nitrogen, a combination of nitrogen and oxygen, or water.

* * * * *